United States Patent [19]

Inoue et al.

[11] Patent Number: 4,790,025
[45] Date of Patent: Dec. 6, 1988

[54] PROCESSING METHOD OF IMAGE DATA AND SYSTEM THEREFOR

[75] Inventors: Toshifumi Inoue; Mitsuhiko Yamada, both of Kyoto; Shigeru Miki, Shiga, all of Japan

[73] Assignee: Dainippon Screen Mfg. Co., Ltd., Kyoto, Japan

[21] Appl. No.: 780,563

[22] Filed: Sep. 26, 1985

[30] Foreign Application Priority Data

Dec. 7, 1984 [JP] Japan ................................ 59-258618
Mar. 29, 1985 [JP] Japan .................................. 60-63762

[51] Int. Cl.$^4$ .............................................. G06K 9/36
[52] U.S. Cl. ........................................ 382/41; 382/44; 382/45; 382/46; 382/47; 340/724; 340/731
[58] Field of Search .................. 364/200, 731, 900; 358/22; 382/41-48; 340/723-724, 727, 731

[56] References Cited

U.S. PATENT DOCUMENTS

| | | | |
|---|---|---|---|
| 4,468,688 | 8/1984 | Gabriel et al. | 382/44 |
| 4,618,991 | 10/1986 | Tabata et al. | 382/46 |
| 4,633,506 | 12/1986 | Kato | 358/22 |
| 4,635,293 | 1/1987 | Watanabe | 382/48 |
| 4,647,971 | 3/1987 | Norman, III | 358/22 |

Primary Examiner—Leo H. Boudreau
Assistant Examiner—Jose L. Couso
Attorney, Agent, or Firm—Davis, Bujold & Streck

[57] ABSTRACT

The present invention makes it possible to reduce the processing time by dividing an image, which is to be subjected to a processing, into a plurality of sections and subjecting the thus-divided images to an image processing in a limited memory space, especially, by making most effective use of the memory spaces of plural buffer memories to reduce the number of divisions of the original picture when a high-speed affine transformation is performed in the plural buffer memories.

5 Claims, 11 Drawing Sheets

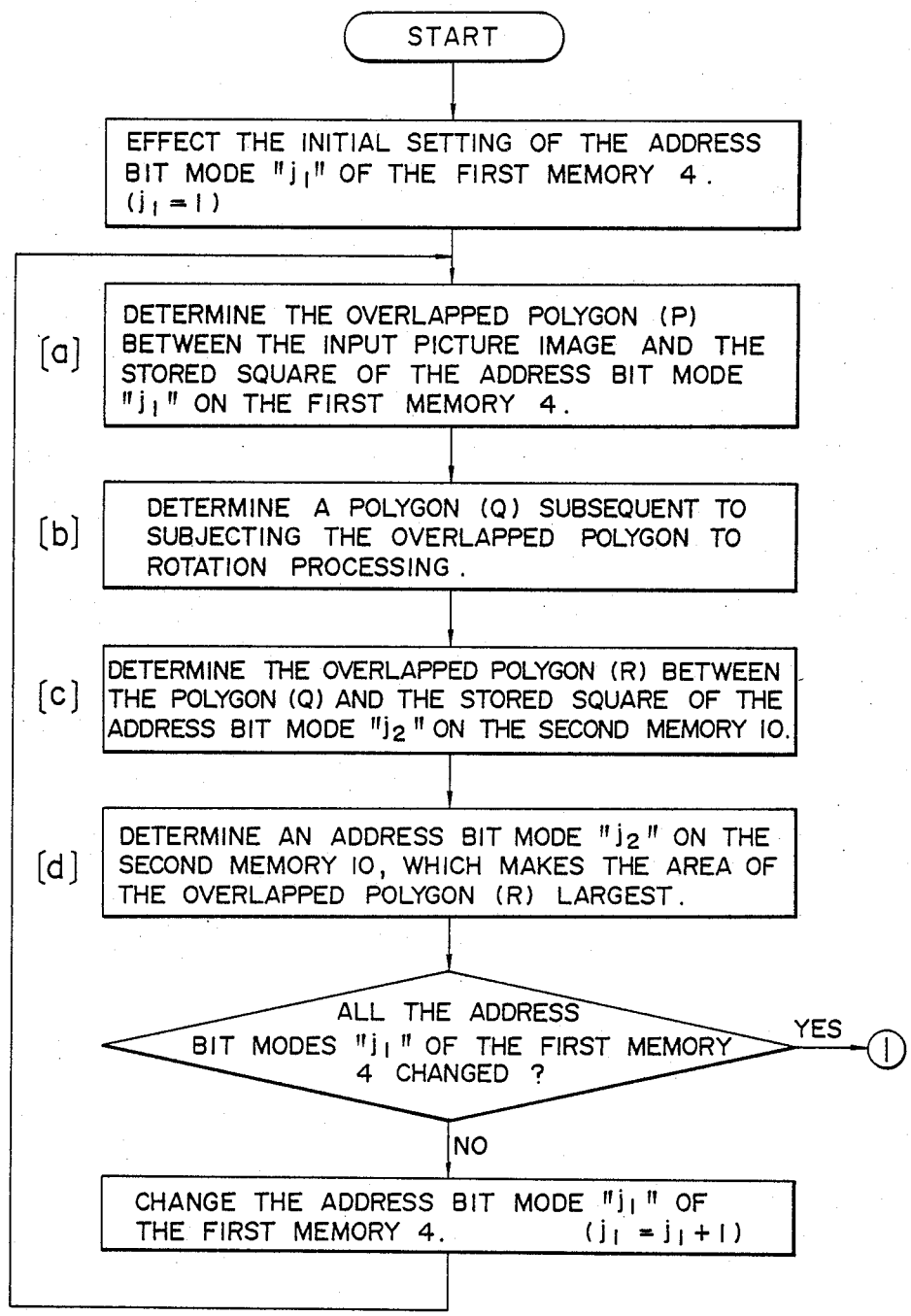
FIG.IIA

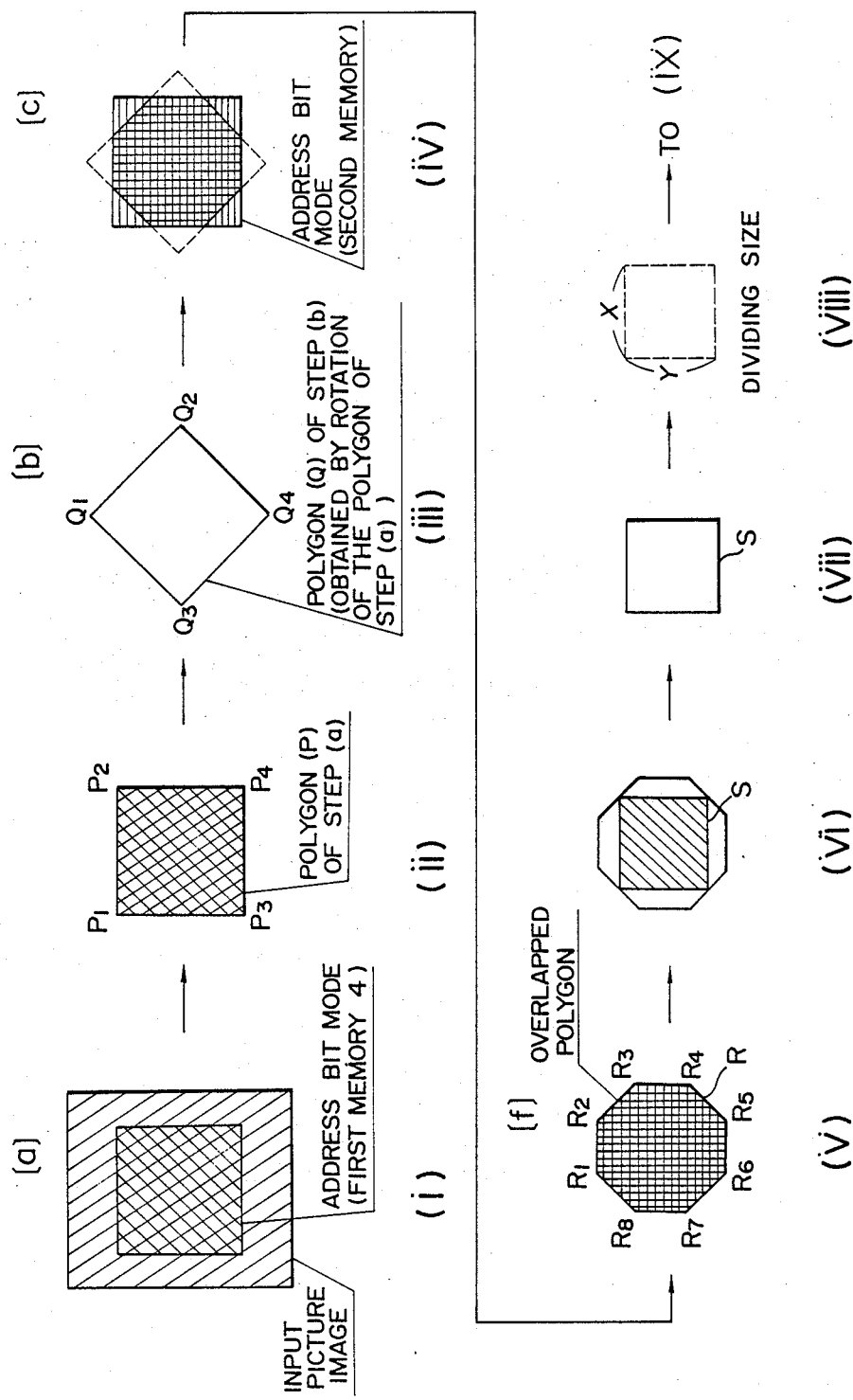

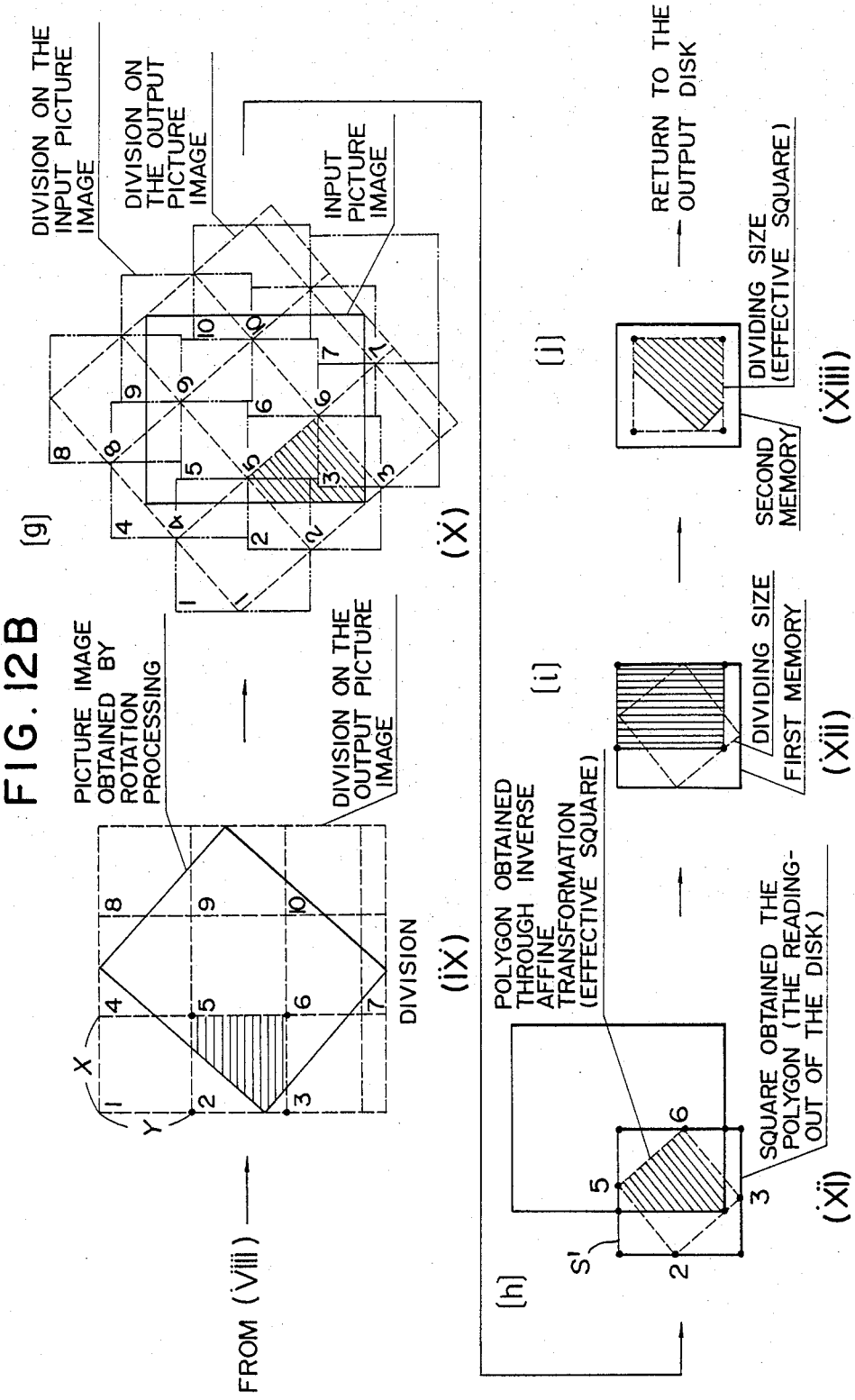

PROCESSING METHOD OF IMAGE DATA AND SYSTEM THEREFOR

This invention relates to a method for processing a high-density picture image which has been processed by an image processing apparatus or a plate-making layout scanner.

Layout scanner systems (which may also be called "total scanner systems") have recently been developed as apparatus suitable for use in the fabrication of color printing plates. In each of such layout scanner systems, a plurality of original pictures are subjected individually to image processing by using a computerized image processing apparatus and the thus-processed images are then put together (this operation is called "assembly") to obtain a layout of a single page.

In each of such conventional layout scanner systems, each image processing (for example, rotation, expansion or reduction or deformation) on the picture elements of a high-density image obtained by a scanner was effected in the stage of an operator's operation, namely, by dividing the image, which is to be processed, into sections in accordance with the capacity of a buffer memory of a two-dimensional configuration the address area of which is fixed, said sections being so small that they can be individually displayed on a monitor, and repeating the image-dividing processing a plurality of times in accordance with the capacity of the buffer, or by thinning the picture elements of the high-density image or averaging plural picture elements to compress the image in advance and then to store the thus-compressed image in the buffer memory, displaying the thus-compressed image on a color monitor, subjecting the thus-displayed image to a desired image processing in accordance with an operator's instruction if necessary; inputting the above-divided image successively into the buffer memory at the level of fine picture elements of actual high-density images in accordance with the details instructed by the operator while making use of an image data processing function of computer software; and then subjecting the divided image again to image processing.

One or more of the above-processed images are thereafter assembled on the entirety of a single page so as to produce single-page prints of a high accuracy.

The above image processing method is however accompanied by a drawback that it takes lots of time when the coordinate conversion processing is effected in various ways, such as rotation, deformation, expansion or reduction, and the like.

An object of this invention is to provide a method for reducing the processing time by effecting the above-described processing method for a high-density image, which method involves a coordinate conversion, through a direct affine transformation even when processings such as rotation, deformation, expansion or reduction and the like are performed on an actual image of high-density picture elements.

Since an affine transformation is a coordinate conversion for directly converting the coordinates of individual picture elements of a high-density image into the corresponding coordinates in another coordinate system, it requires at least two two-dimensional buffer memories which can be accessed (read and written) at a high speed. In each of conventional image-processing buffer memories, the size of an image to be processed through an affine transformation or an affine-transformed image is not consistent with the size of a two-dimensional array having sections (coordinate axes) the address lengths of which are fixed. When an image is divided into several sections and is repeatedly processed or when an image of a size greater than the capacity of a memory is divided simply in accordance with a fixed address length and is then subjected to rotation by its affine transformation, the effective image region occupying the memory space is reduced to a significant extent in some instances. It is another object of this invention to solve such a shortcoming.

The present invention makes it possible to reduce the processing time by dividing an image, which is to be subjected to a processing, into a plurality of sections and subjecting the thus-divided images to an image processing in a limited memory space, especially, by making most effective use of the memory spaces of plural buffer memories to reduce the number of divisions of the original picture when a high-speed affine transformation is performed in the plural buffer memories.

The processing of image data can be performed at a high speed and in a large volume by controlling the addresses of a buffer memory, which is adapted to process image data at a high speed, to change the lengths of the address (X,Y) in a two-dimensional X,Y array in such a way that the buffer memory can be used as a buffer memory in which the image shape in the two-dimensional memory space can take a square or various rectangles, and performing in advance calculation of a shape to be obtained after the processing of an image by an affine transformation or the calculation of changes for the processing, and in the case of an image the shape of which changes by the affine transformation, by determining which shape of the buffer memory should be used to make the effective processing region of the processed image in the memory space maximum.

In one aspect of this invention, there is thus provided a method for processing data on an original picture, which data are stored as image data in a memory having a large capacity and a relatively low access speed, said method including (a) dividing at least one group of the data into a plurality of data portions on the basis of a processable size between two memories capable of performing writing and reading at high speeds, (b) reading out the image data in each data portion from the low-speed memory to perform at least one type of image processing on the read-out image data between the high-speed memories, (c) storing the thus-processed image data again in the low-speed memory, and then (d) performing the above steps (a) through (c) repeatedly on the entirety of the data on the original picture so as to store the processed data on the original picture in the large-capacity and low-speed memory, characterized in that the address control of each of the two memories having the high access speeds and employed in the course of the image processings (a) through (d) is performed in accordance with a multidimensional array, and the processing of the image data between the two memories is performed by changing the address length in each dimension of at least either one of the two memories so as to reduce the number of divisions of the picture upon effecting the image processing.

In another aspect of this invention, there is provided a system for processing data on an original picture, which data are stored as image data in a memory having a large capacity and a relatively low access speed, said method including (a) dividing at least one group of the data into a plurality of data portions on the basis of a processable size between two memories capable of performing writing and reading at high speeds, (b) reading out the image data in each data portion from the low-speed memory to perform at least one type of image processing on the read-out image data between the high-speed memories, (c) storing the thus-processed image data again in the low-speed memory, and then (d) performing the above steps (a) through (c) repeatedly on the entirety of the data on the original picture so as to store the processed data on the original picture in the large-capacity and low-speed memory, characterized in that the system is equipped with at least two image memory devices, which are employed in the course of the image processings (a) through (d), can perform reading and writing at high speeds and are address-controlled in accordance with multidimensional arrays, and address control means which permits the processing of the image data between the two memory devices while changing the address lengths of the respective dimensions of at least either one of the two memory devices in such a way that the number of divisions of the picture is reduced upon performing the processing of the image data.

In a further aspect of this invention, there is also provided a memory device the control of addresses of which is performed in accordance with a two-dimensional array of numerical addresses of n bits, characterized in that before the address input terminal of the memory, there is additionally provided an address modification circuit adapted to produce numerical address signals of n bits, in each of which signals the sizes of the array elements in the x-address and y-address are different, from x-addresses of a two-dimensional image in which one array elements of arrayed addresses are expressed by l bits, y-addresses of the two-dimensional image in which the other array elements are expressed by m bits, where $(n-1) < m$, and parameter signals input based on the size of the two-dimensional image.

Owing to the use of two-dimensional memory devices of variable address lengths in an image processing apparatus such as layout scanner, image data can be processed with a minimum repetition of processing by obtaining an address bit mode most suitable for the memory devices in advance with controlling and calculating means such as CPU.

By effecting an optimized division on an image, an image processing that requires coordinate conversion such as rotation, expansion or reduction, deformation or the like can still be performed while requiring fewer access to the low-speed memory, namely, with a good processing efficiency.

In addition, a picture which is more complex and has a greater page size compared with conventional pictures can also be processed with a good efficiency by applying the method of this invention to a layout processing in which a plurality of original pictures are arranged on a single page and are then processed.

The above and other objects, features and advantages of the present invention will become apparent from the following description and the appended claims taken in conjunction with the accompanying drawings, in which:

FIGS. 11A and 11B is a flow chart of a processing according to this invention;

FIGS. 12A and 12B is a drawing showing various steps in the course of a specific image processing performed following the flow chart;

Figure 1:
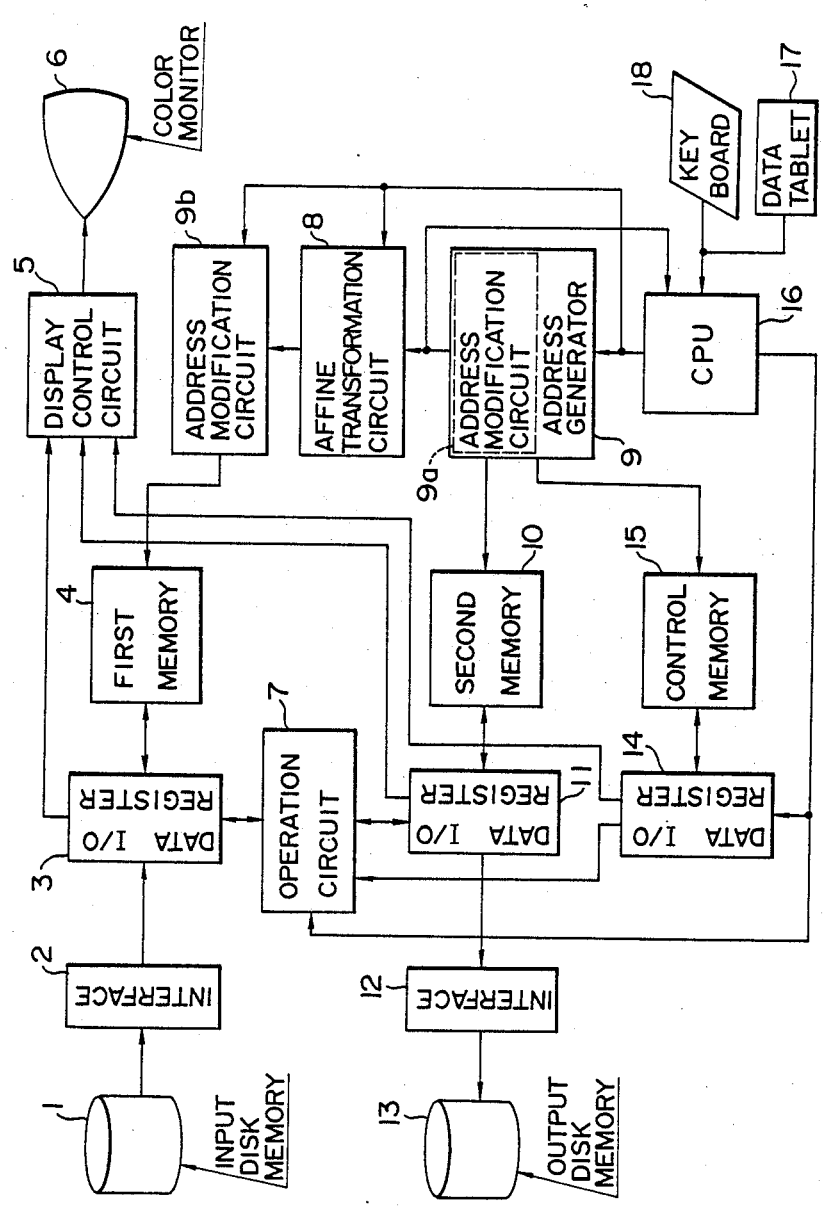
FIG. 1 is a block diagram of the basic construction of a layout scanner according to the present invention.

Referring first to FIG. 1, numeral 1 indicates an input memory having a low access speed and a large capacity. A magnetic disk memory is primarily used as the input memory 1. High-density image data (which will hereinafter be referred to as "the original image") on an original picture, which have been obtained by scanning the original picture with an unillustrated color scanner and are to be processed, are stored in the input disk memory 1.

The original image or an image section, which is a section of the original image, is read out from the input disk memory 1 and is then input via an interface 2 to a data I/O register 3 of a first memory 4 so that the original image or image section is loaded on the first memory 4 through designation of addresses of the first memory 4 by usual addressing means.

In order to display the image which has been loaded on the first memory, the image is read out from the first memory 4 in synchronization with a video frequency by a conventionally-known video memory read-out means, is sent to a display control circuit 5, and is then displayed as an image on a color monitor 6.

Upon displaying the image in the first memory 4, the contents of a second memory 10 and those of a control memory 15 are concurrently read out if needed, whereby the image in the first memory 4 may be displayed in combination with such contents or a masking control may be performed using the contents of the control memory 15.

The illustration and description of such a display are omitted here, since generally-applicable technical means have already been developed for the display of such images and they are not directly related to the essential features of this invention.

Upon performing the display of the image, the sizes of the two-dimensional arrays of the first memory 4 and the other two memories 10,15 are rendered consistent with the display screen. Namely, the coordinate system of each of the memories 4,10,15 and the coordinate system on the color monitor 6 are supposed to correspond exactly to each other. For the sake of convenience in description, a square is to be used as the size of each of the memories and display screen. In passing, a mode in which the size of each memory area is changed in two dimensions is employed in a below-described memory-addressing method pertaining to the present invention. This mode will however not be used when images are merely monitored.

Furthermore, description will be made supposing that a generally-available video memory has a capacity of 1,024×1,024 elements as its size.

In spite of the above-mentioned size of the video memory, namely, the resolution of the color monitor 6, the size of each picture element of an original image color-separated by a printing color scanner and collected as a sample is generally 50 μm square or so. There are thus 2,000×2,000 picture elements even in the case of a picture (image) of 10 cm square. It is thus impossible to store the whole original image in the first memory 4 while using the first memory 4 as a video memory. Even if storage of the whole original image is feasible, it is generally impossible to display the whole image at once. Accordingly, description will next be made supposing that the whole contents of the first memory cannot be displayed normally.

In order to cope with this drawback, the interface 2 is imparted with a function to compress the original image by thinning the picture elements of the original image at a constant interval or by averaging data on plural picture elements and then making the thus-averaged data correspond to a single piece of picture element. In this manner, the original image may be displayed in its entirety on the color monitor 6. It is however impossible to perform any final operation processing on an image which has been obtained by thinning or compressing picture elements in the above-mentioned manner. It is indispensable to subject all the high-density picture elements of the original image one bbbKy one to a data processing.

In order to apply an accurate image processing to an original image, it is necessary to divide the original image into a plurality of sections, to subject each of the thus-divided image sections to their respective image processings, and to repeat the image processings. It is one object of this invention to perform such an image processing at a high speed. Certain specific embodiments of this invention for effecting such a high-speed image processing will be described in detail later in this specification.

The overall operation of a layout scanner incorporating the present invention in its principal part will next be described on the basis of FIG. 1.

The image data which have been loaded on the first memory 4 may be subjected to various image processings as needed.

For example, the data on the respective picture elements of the image in the first memory 4 are read out successively in a desired order designated in address by an address generation circuit 9. The read-out image data are input to an operation circuit 7 by way of the data I/O register. After subjected to desired data processing or processings at the operation circuit 7, the resultant image data are then written, through a data I/O register 11, in the second memory 10 the addresses of which are designated by the address generation circuit 9.

The data are transferred successively over the entire memory region or regions of the first memory 4 or second memory 10 or the first and second memories 4,10, thereby completing the processing of the data.

Figure 2:
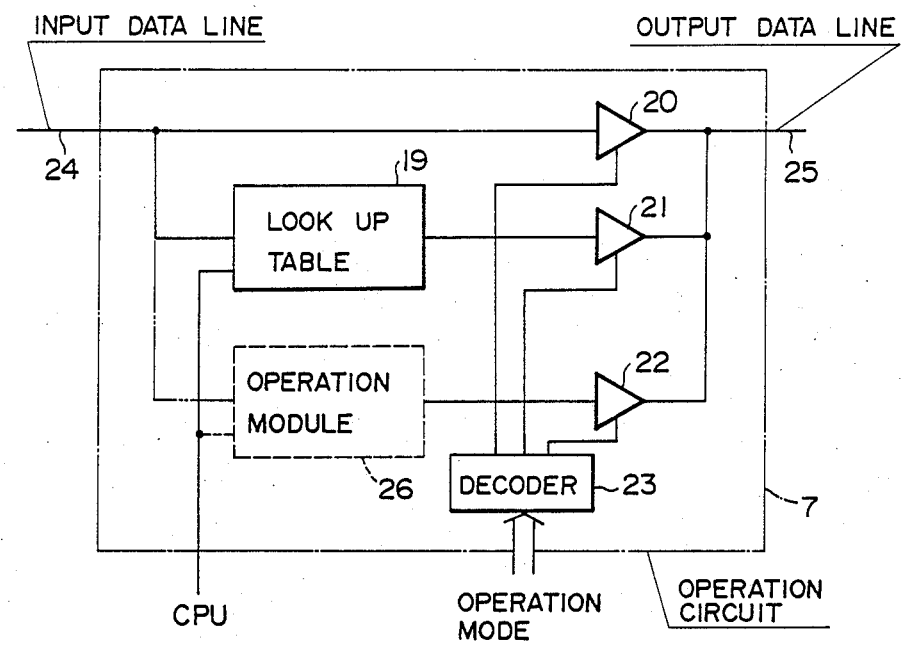
FIG. 2 is a block diagram showing one embodiment of an operation circuit.

The operation circuit 7 has such a structure as permitting pipeline processing, for example, as illustrated in FIG. 2.

In FIG. 2, data input from an input data line 24 of the operation circuit 7 are operated at various operation modules 19,26 in accordance with the details of data processing. When a change in graduation is effected for instance, it is feasible to use, as the operation module 19, a general lookup table in which certan reference data on characteristics subjected to changes- in connection with the changes in graduation have in advance been stored by a central processing unit (which may be composed of a microprocessor or the like and will hereinafter be called "CPU") 16 adapted to centrally control the present image processing system. When data processing is required by the operation module 19, CPU 16 beforehand outputs a control code, as an operation mode for effecting changes in graduation, to a decoder 23 so that a buffer 21 is kept open. Here, the control code interpreted by the decoder 23 disables other buffers 20,22 so that no data are allowed to pass through the buffers 20,22.

The designation of the operation mode is given by means of a control code having a suitable number of bits. The control code is decoded and interpreted by the decoder 23, whereby the output-side buffer of an operation module the processing details of which have been designated by the operation mode is enabled.

The image data, which are to be processed, are sent through the input data line 24 and are converted to desired image data with reference to the lookup table 19. The thus-converted image data are output from the buffer 21 to an output data line 25. These operation circuits perform pipeline control.

The operation circuit 7 is equipped with the buffer 20 by which the input line 24 and output line 25 are connected directly to each other. This buffer 20 is enabled when a pass mode, in which no operation is performed, is designated. This pass mode may be used, for example, when a portion of image data on the coordinate system of the first memory 4 is subjected to coordinate conversion and is placed on the coordinate system of the second memory 10, for example, by a below-described affine transformation or the like without processing the image data per se.

Furthermore, the operation circuit 7 is provided with the operation module 26 which can perform pipeline processing and is adapted to perform various operations. More operation modules, each of which is of the same type as the operation module 26, may be additionally provided depending on the details of required operations. As the operation function of the operation module 26, may for example be mentioned processing on color data such as color masking correction, color correction, under color removal (UCR) or color hue discrimination, filter processing such as contour emphasis, or clipping mask processing such as selective input of a masked image to the control memory 15. The hardware structure for achieving such an operation function may be composed of the above-mentioned lookup table, an operation unit for performing addition, subtraction, multiplication and division by AND-gate devices, comparator or another IC device having a data-operating function which permits pipeline processing. In addition, the through-put of the operation module 26 can be chosen as desired from a relatively wide range, snce the operation module 26 can be readily synchronized with the address timings of the first and second memories 4, 10.

After each of the additionally-provided operation modules 26, a buffer equivalent to the buffer 22 is also provided as an additional element.

Results of the above operation are then stored in the second memory 10.

In the image processing system, it is feasible to confirm visually the state of image both before and after its processing by displaying the contents of the first and second memories 4, 10 respectively on the monitor 6.

When it is desired to process only a specific region out of an image which requires processing, masking data of 1 bit per address are stored in advance in the control memory 15 through the CPU 16. Data common to the addresses are read out simultaneously from the first memory 4 and control memory 15. When the data from the control memory 15 is of a mask-invalidating bit, for example, of the logic "1", the lookup table 19 and buffer 21 or the other operation module 26 and buffer 22 are enabled by the bit in order to subject the data to operation processing by the operation circuit 7. When the data is of an effective masking bit, for example, of the logic "0", the buffer is enabled to send the date to the second memory 10 for their storage by changing the operation processing to the pass mode to skip operation processing on the data. The image processing system of this invention can also perform the above-mentioned control.

Here, the masking data from the control memory 15 is delivered together with codes, which represent other operation modes, to the decoder 23 of the operation circuit 7 by way of the data I/O resister 14.

Although the data in the control memory 15 have been stored in advance via the CPU 16, the CPU 16 prepares masking data on the control memory 15, for example, by drawing a circle line on a two-dimensional coordinate system corresponding to the address area of the first or second memory 4 or 5, filling the circle line and its interior with bits of the logic "1" and giving bits of the logic "0" to the exterior of the circle line in accordance with a command, designation of a function and its parameters for drawing curves, coordinate data and the like, which are input by the operator through an input terminal for the CPU 16, namely, a data tablet 17 or keyboard 18. Here, coordinates desired by the operator for drawing a pattern can be obtained on the color monitor 6 by displaying them on the color monitor 6 with a cursor corresponding to the memory region.

As other utility of the control memory 15, it may also be used to arrange a plurality of images one by one on a single page, in other words, to conduct assembly work which is one of principal functions of a layout scanner.

The assembly work can also be performed by using the control memory 15 in much the same way as mentioned above. For example, making use of a closed boundary line which an operator can beforehand draw through the CPU 16, a bit pattern is prepared on the control memory with the inside or outside of the closed boundary line being filled with "0"s or "1"s. Corresponding to the addresses in the "1" section of the bit pattern, the image is transferred from the first memory 4 to the second memory 10. An image-relocating processing making use of such an intermemory data transfer is repeatedly performed on various original images and contours which mask the original images further so that a single page containing a plurality of original images assembled thereon is produced on the second memory 10.

When the second memory 10 is used for pipeline processing through the above-described intermemory transfer or two images having different picture patterns are combined together, one of the images is beforehand loaded partly or in its entirety from the input disk 1 onto the second memory 10 by way of the interface 2, data I/O register 3, the pass mode of the operation circuit 7 and data I/O register 11.

By using the control memory 15 in the above-described manner, a section or the whole part of the other image, which is required for overlapping, is read out from the first memory 4 and the two images are written in combination onto the second memory 10.

Thereafter, processing results on the second memory 10 are transferred in a desired data mode, for example, in a file mode to the output disk 13. At this time, the processing results are fed from the second memory 10 to the interface 12 via the data I/O register 1, followed by their storage in the output disk memory 13.

The final results stored in the output disk memory 13 are output to an image recording unit of an unillustrated color scanner upon utilization of the image data. At the image recording unit, the final results are recorded as a hard picture and used as an original printing film.

The address generation circuit 9 produces address signals for designating the addresses of the first memory 4, second memory 10 and control memory 15 respectively.

Semiconductor memory devices which are useful as memories in the present invention are preferably of high access speeds. When semiconductor memory devices having relatively slow access time, image data may be read out as parallel data from the memories so as to make them correspond to a video frequency and thereafter, the parallel data may be converted to serial image data for their display. In this case, the memory-addressing mode is slightly different from that employed in the above processing. Namely, addresses are designated to both data display mode and data operation mode. The above-described processing technique in the data display mode is usual technical means and its description is hence omitted here.

By the way, the address generation circuit of the data operation mode pertaining to the present invention will be described later in this specification.

An affine transformation circuit 9 is used when two-dimensionally arrayed addresses, which have been produced for the control of addresses through an address modification circuit 9a in the address generation circuit 9, are subjected to an affine transformation. After the affine transformation, the resultant two-dimensionally arrayed addresses are converted via an address modification circuit 9b to numeral addresses, which are then given to the first memory 4.

In other words, when subjecting an image on the first memory 4 to an affine transformation, numeral addresses corresponding to the second memory 10 which is adapted to store an image after its affine transformation are generated in advance from the address generation circuit 9. The numeral addresses are modified into arrayed addresses, which are in turn subjected to an inverse affine transformation by the affine transformation circuit 8. The thus-obtained addresses are again modified to numeral addresses so as to generate addresses for the first memory 4. In the manner mentioned above, addresses corresponding to the coordinates of the image are determined on the first memory 4 so that the image data of the affine-transformed image loaded on the first memory 4 are read out. As a result, the affine-transformed image is stored on the second memory 10.

In this case, the arrayed addresses produced intermediately are employed for an address control in which the images of both memories 4,10 are handled as two-dimensional (i.e., X-Y) images The outline of an image transformation according to this invention will next be described.

Figure 3:
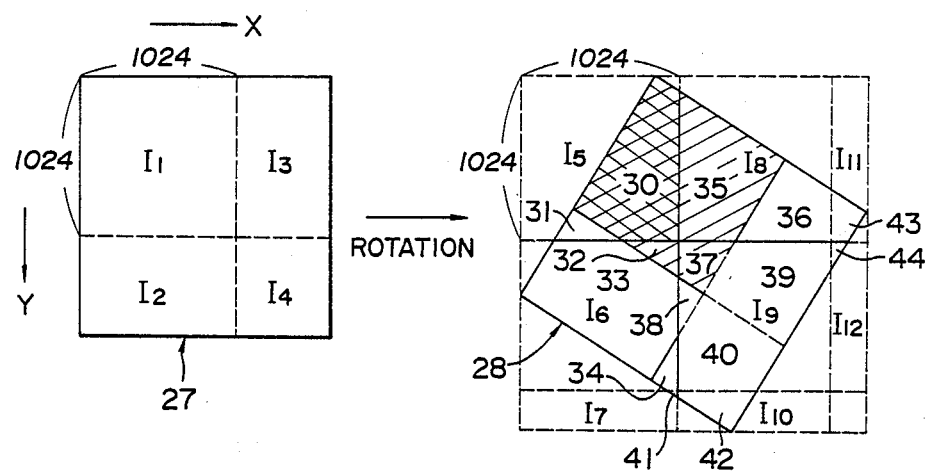
FIG. 3 illustrates the size of a picture.

In FIG. 3, the size of an original image which requires processing is greater than the size (1,024×1,024 picture elements) of the address area of each of the first memory 4 and second memory 10 employed in the Example when the original image 27 is divided into picture elements with a desired resolution. Therefore, the original image 27 cannot be processed at once in its entirety. In the illustrated Example, the image is divided into at least four sections $I_1$–$I_4$ for their processing.

FIG. 3 may also be referred to for describing an image rotation processing in which the original image 27 is rotated over a desired angle $\theta$ to obtain an image 28.

In order to compare the processing of the present invention with the processing by the conventional address-fixing method, the production of the rotated image 28 on the second memory 10 in the system shown in FIG. 1 will hereinafter be discussed supposing that the address control is performed by the CPU 16, namely, two-dimensionally arrayed addresses are used.

First of all, a section of the original image 27 which section is of a size small enough to permit its storage in the first memory 4, namely, the section of the region $I_1$ is loaded from the input disk 1 onto the first memory 4.

Thereafter, addresses are produced for the second memory 10. At the same time, the addresses are subjected to an inverse affine transformation. When the inverse affine-transformed addresses correspond to (are present on) the addresses of the first memory 4, data are read out from the addresses and are then stored in the second memory 10 at addresses designated by the addresses before the inverse affine transformation.

In this manner, addresses are successively produced until all the addresses of the second memory are scanned. When data are present on the first memory 4 at addresses corresponding to the inverse affine-transformed addresses, the data are transferred onto the second memory 10 so as to store on the second memory 10 the image section 30 which corresponds to a region $I_1$ shown in FIG. 3.

It is then necessary to produce an image section 31 corresponding to a region $I_2$ on the second memory 10. Since this section was formed as a result of rotation of the region $I_2$ of the image 27, the section corresponding to the region $I_2$ is read out from the input disk memory 1 onto the first memory 4 so that the section $I_2$ is loaded on the first memory 4.

Then, addresses are produced while making addresses corresponding to the image section 31 of the region $I_2$ correspond to the second memory 10. The addresses are then subjected to an inverse affine transformation, whereby data are read out from the corresponding section on the first memory 4 and are then stored on the second memory 10.

In the manner mentioned above, image sections 30,31 of the original image 27, which image sections are contained in the region $I_5$ after the rotation of the original picture 27, are produced on the second memory 10.

The data in this region $I_5$ are output from the second memory 10 and are then stored in the output disk 13 by way of the data I/O register 11 and interface 12.

Thereafter, in the same manner as that mentioned above, regions $I_6$–$I_{12}$ corresponding to the address areas of the second memory 10 are repeatedly processed so that image sections 33,32,34 are produced in the region $I_6$, image sections 35,36 in the region $I_8$, image sections 37,38,39,40 in the region $I_9$, image section 41 in the region $I_7$, image section 43 in the region $I_{11}$, image section 44 in the region $I_{12}$ and finally, image section 42 in the region $I_{10}$ to complete a rotated image 28.

Since the processing is performed in the opposite direction, the original image 27 is divided into 4 sections and the rotated image 28 is divided into 15 image sections.

For the reasons mentioned above, the number of access to the input and output disk memories 1,13 having low access speeds becomes very high. In the region $I_9$, the access to the input disk 1 is performed as many as 4 times, leading to very long processing time.

In the present invention, the above problem has been solved in the following manner.

(I) In the first memory 4, second memory 10 and if necessary, control memory 15, the address length of each of the X-Y addresses expressed in two-dimensional arrays is rendered variable. Namely, the image of a two-dimensional address area is expressed by a shape so that the image can be used as a two-dimensional shape ranging from a square to a rectangle such as $X=X$, $X=2Y, \ldots, 2X=Y, \ldots$ This will hereinafter be called an address bit mode "j" as such shapes represent individual image shapes of address areas.

By the way, the address control is effected in accordance with a multidimensional array in the following Examples. This means that the form of address signals is multidimensional when controlling addresses by the CPU 16 or performing the calculation of addresses by the affine transformation circuit 8. It should thus be borne in mind that the form of designation of addresses on a hardware, which directly designates addresses of each memory, is not necessarily multidimensional.

(II) A processing work area capable of affording the highest processing efficiency is determined upon processing an image by means of a memory which can take various square or rectangular shapes. In other words, it is determined that an address bit mode "j" of which memory shape should be used to permit the handling of a larger image section by a single processing operation.

(III) An actual processing is performed in accordance with the results of the address bit mode "j" obtained in the above step (II) and the individual affine factors for the affine transformation. Here, the processing time can be shortened when the division of the image is minimized.

The address modification circuit 9a of the first type, the address modification circuit 9b of the second type and the affine transformation circuit 8, all contained in the address generator 9 shown in FIG. 1, are incorporated to achieve the above-described objects. Their specific examples are depicted in FIG. 4 through FIG. 10.

Figure 4:
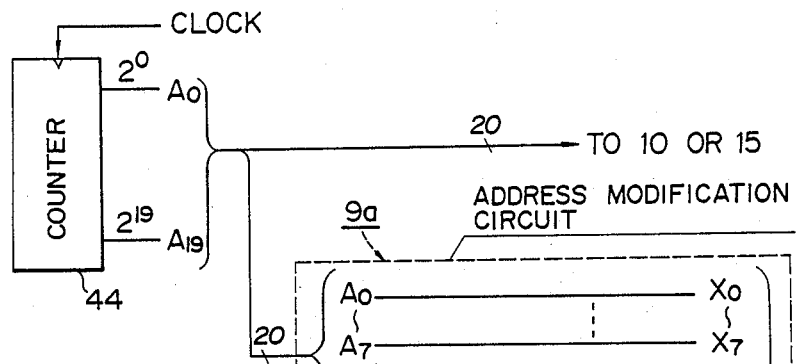
FIG. 4 is a block diagram illustrating the first embodiment of an address generator.

In FIG. 4, arrayed X-addresses ($X_A$) and Y-addresses ($Y_A$) which are respectively represented by their corresponding array elements X,Y of the two-dimensional array (X,Y) are produced, with their address lengths being variable, from numeral addresses of the bit parallel type. Specifically speaking, in the illustrated example, an address line of 20 bits is divided into upper digits and lower digits relative to some intermediary bits, and the intermediary digits are shifted either upwardly or downwardly so as to change each of the address lengths of the X and Y addresses.

In FIG. 4, the address bit mode "j" is preset in such a way that among the digits $X+Y=20$ dividable into X and Y as two-dimensionally arrayed addresses when the numeral addresses corresponding to the address area of each memory are of 20 bits (1—M capacity), X and Y are respectively of 8 bits and 12 bits when the address bit mode is set at "1", X and Y are respectively of 9 bits and 11 bits when the address bit mode is set at "2", ... , and X and Y are respectively of 12 bits and 8 bits when the address bit mode is set at "5".

In FIG. 4, the address generation circuit 9 designates the addresses of the first memory 4 by way of the affine transformation circuit 8 and the address modification circuit 9b of the second type. The timing clock of this circuit enters a counter 44, whereby the counter 44 outputs numeral address signals A of 20 bits which are indicated by $2^0-2^{19}$ digits of the respective bit parallel obtained by counting the clock in accordance with the binary notation.

Address signals $A_0-A_7$ which correspond respectively to the lower digits $2^0-2^7$ of the outputs of the counter 44 are output as the lower digits $X_0-X_7$ of the X-addresses as they are irrespective of the address bit mode "j". Address signals $A_8-A_{19}$ corresponding to their upper digits $2^8-2^{19}$ are input to their corresponding shift circuits 45, where the individual digits are shifted either upwardly or downwardly in accordance with one mode selected in advance from the address bit mode "j"="1"-"5" so that the address signals $A_8-A_{19}$ are divided into either arrayed X-addresses $X_A$ or arrayed Y-addresses $Y_A$.

Figure 5:
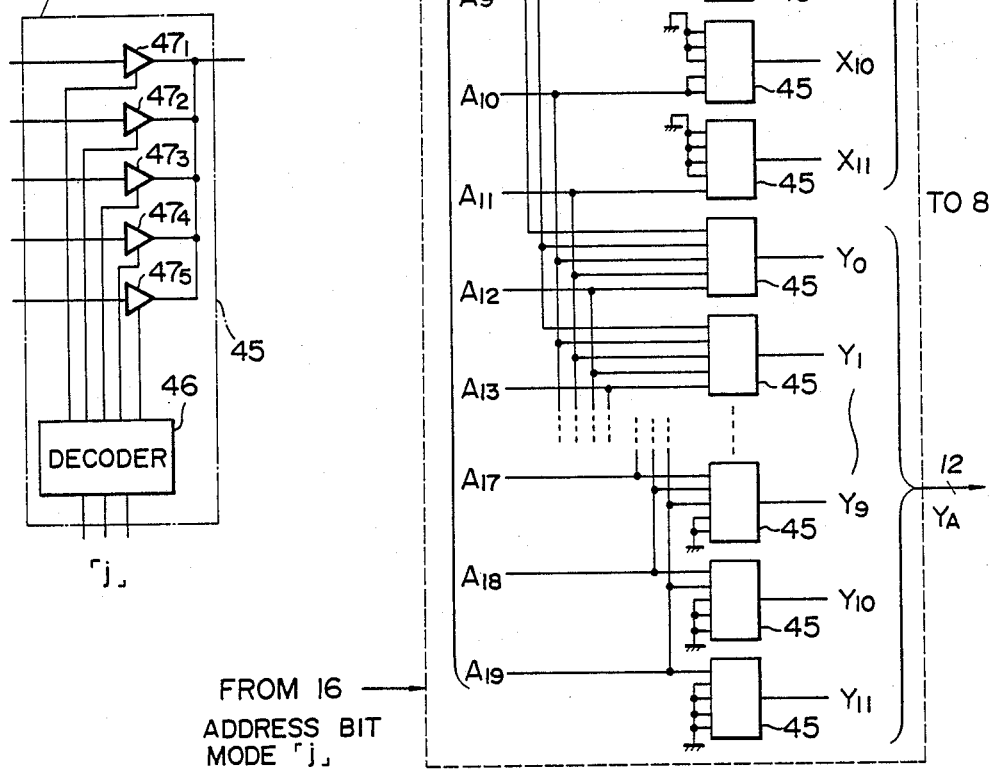
FIG. 5 is an electric circuit diagram showing one specific example of the shift circuit depicted in FIG. 4.

Each of the shift circuits 45 has such a structure as a circuit depicted in FIG. 5. When one of the codes "1"-"5", which designates the corresponding one of the address bit mode "j", is given in a 3-bit code, the code "j" is fed to a decoder 46. The decoder 46 produces an output in such a bit pattern that "1" appears in only one of the digits of output bits, for example, such as 1, 0, 0, 0, 0 from the leftmost digit in the case of the address bit mode "1", 0, 1, 0, 0, 0 in the case of the address bit mode "2", ..., and 0, 0, 0, 0, 1 in the case of the address bit mode "5".

When the above-described code is input to the decoder 46, one of buffers $47_1-47_5$ which is associated with an output line "1" of the decoder 46 is enabled. The shift circuits 45 output $X_A$-addresses and $Y_A$ addresses in accordance with the selected address bit mode "1"-"5".

When the address bit mode is "1" for example, $X_8=X_9=X_{10}=X_{11}=0$. Thus, the $A_8$ digit is shifted to the $Y_0$ digit and is then output. Similarly, the corresponding digits are successively shifted in such a way that the $A_9$ digit is shifted to the $Y_1$ digit, ...

As described above, the address modification circuit 9a of the first type illustrated in FIG. 4 modifies numeral address signals A obtained by the counter 44, for example, address signals expressed by a binary code of n bits into arrayed addresses of the same kind as the expression of the coordinate system on which images are handled, for example, into X-address signals of l bits and Y-address signals of m bits where $n=l+m$.

Figure 6:
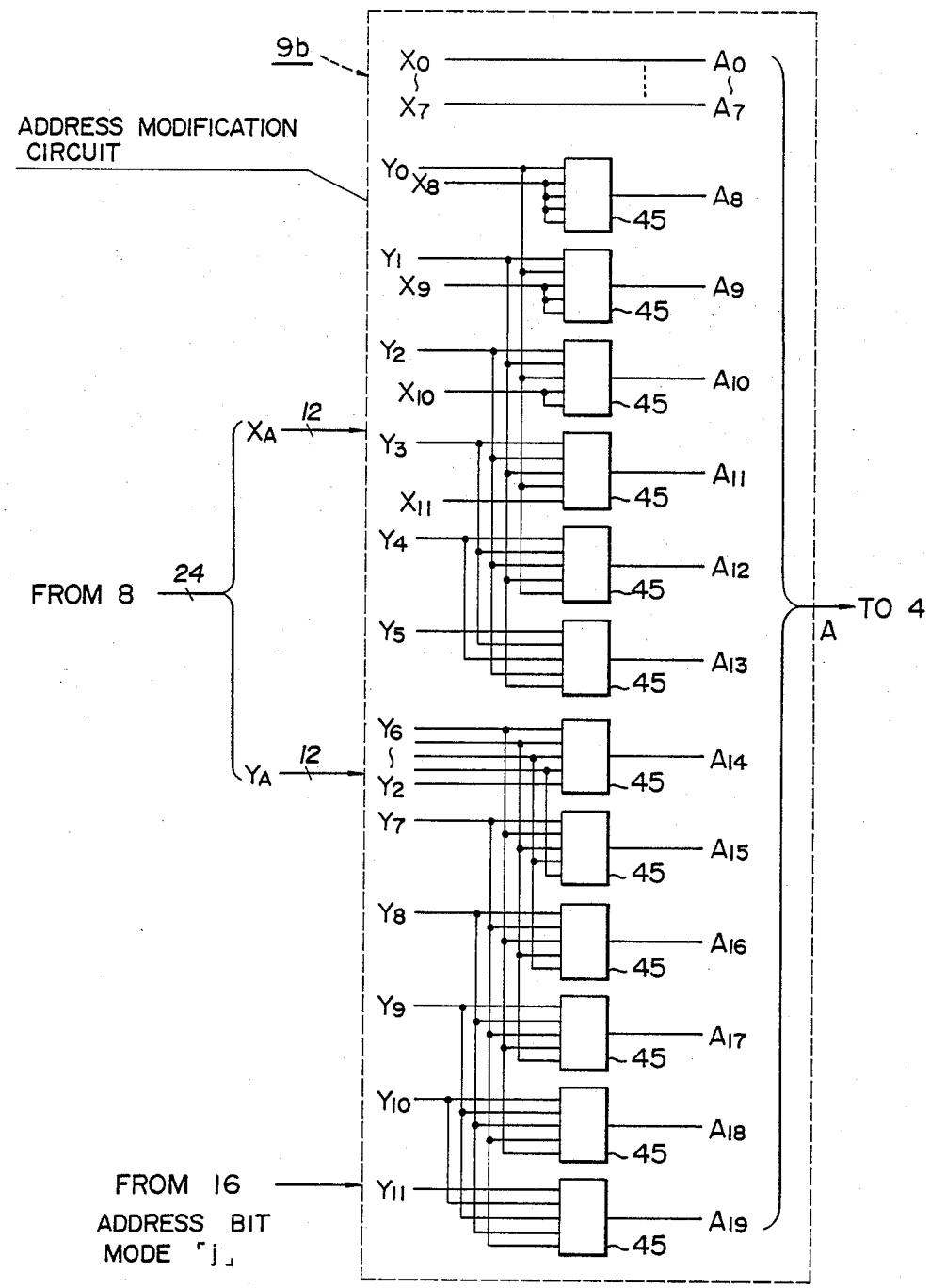
FIG. 6 is an electric circuit diagram showing one specific example of an address modification circuit of the second type.

It is the address modification circuit 9b of the second type shown in FIG. 6 that modifies the arrayed address signals into numeral address signals.

This address modification circuit 9b of the second type is a circuit complementary to the above-described address modification circuit 9a of the first type. By suitably shifting desired digits as illustrated in FIG. 4 in accordance with the address bit mode "j" while making use of the shift circuits 45 shown in FIG. 5, the address modification circuit 9b outputs the exactly same numeral address signals A as the numeral address signals A input to the address modification circuit 9a, for example, when arrayed address signals $X_A,Y_A$ are output from the address modification circuit 9a and are then input as they are without any affine transformation.

Figure 9:
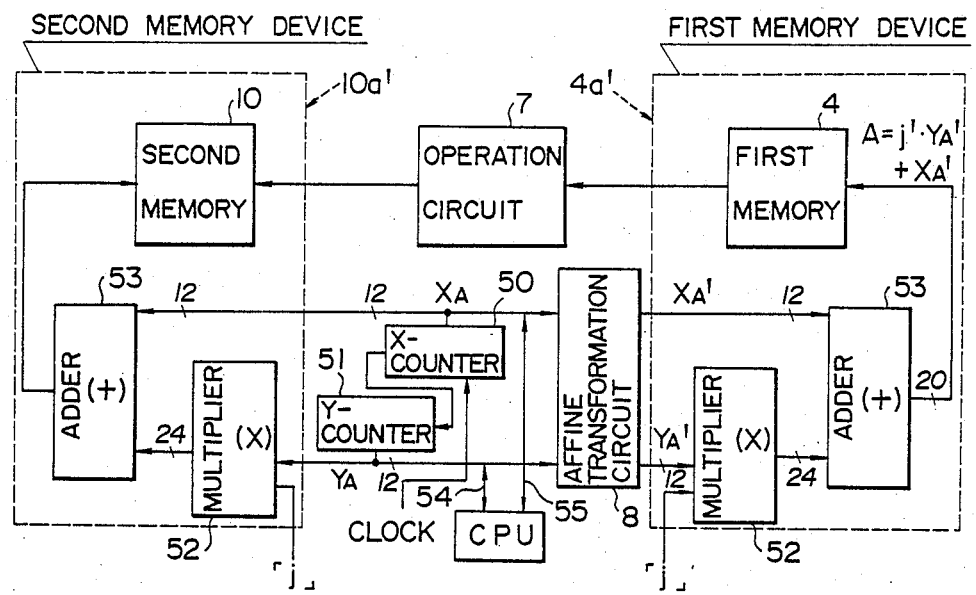
FIG. 9 is a block diagram showing the second embodiment in which the addresses of the first and second memories are identified by the address generation circuit and address of FIG. 7.

FIG. 9 illustrates one example of another address generation circuit 9' which functions in the same manner as the above-described address generation circuit 9. This address generation circuit 9' can generate arrayed addresses $X_A,Y_A$, can modify them into numeral addresses and can they give the numeral addresses to the first memory 4, second memory 10 and control memory 15.

The timing clock of the circuit inputs circulating counts n as programmable to an n-representation X-counter 50. The X-counter 50 outputs a carry-complete signal whenever n pieces of clock pulses have been counted. Each carry-complete signal is then input to a Y-counter 51.

To the X-counter 50, a code setting the count number n is given by a code "j'" having a value corresponding to the address bit mode "j". For the sake of convenience, the address bit mode will be represented by "j'" in the following explanation.

In this example, the address bit mode "j" by a value $X_{max}+1=j'=n$ which is greater by 1 than the maximum value $X_{max}$ of the X addresses of an X,Y-array.

When the number of address bits of a memory is set at 20 bits for example, $X_{max}=Y_{max}=1023$ where the image of its address area is square. Here, the address bit mode "j'" is given by 1024 (j=3).

When $X_{max}=255$ and $Y_{max}=4095$, $j'=256$ (j=1) and furthermore, when $X_{max}=4095$ and $Y_{max}=255$, $j'=4096$ (j=5).

The X-counter 50 to which the address bit mode "j'" has been given generates, as its outputs $X_A$, values of $0-X_{max}$. These values are circulated. The Y-counter 51 adds its count and generates an output $Y_A$ to a multiplier 52 whenever the X-counter 50 counts $X_{max}$.

The above-mentioned address bit mode "j'" is given to the multiplier 52, which multiplies the output $Y_A$ of the Y-counter 51 by the address bit mode "j'" to generate $y=j'\cdot Y_A$ as its output.

The X-counter 50 outputs the value $X_A$ of the arrayed elements of the X addresses in digits of 12 bits while the multiplier 52 outputs $y=j'\cdot Y_A$ in digits of 24 bits. Both outputs $X_A$ and $y=j'\cdot Y_A$ are added at an adder 53. The lower 20 bits of the 24-bit output $A=j'\cdot Y_A+X_A$ of the adder 53 are given as addresses to the second memory 10.

Figure 10:
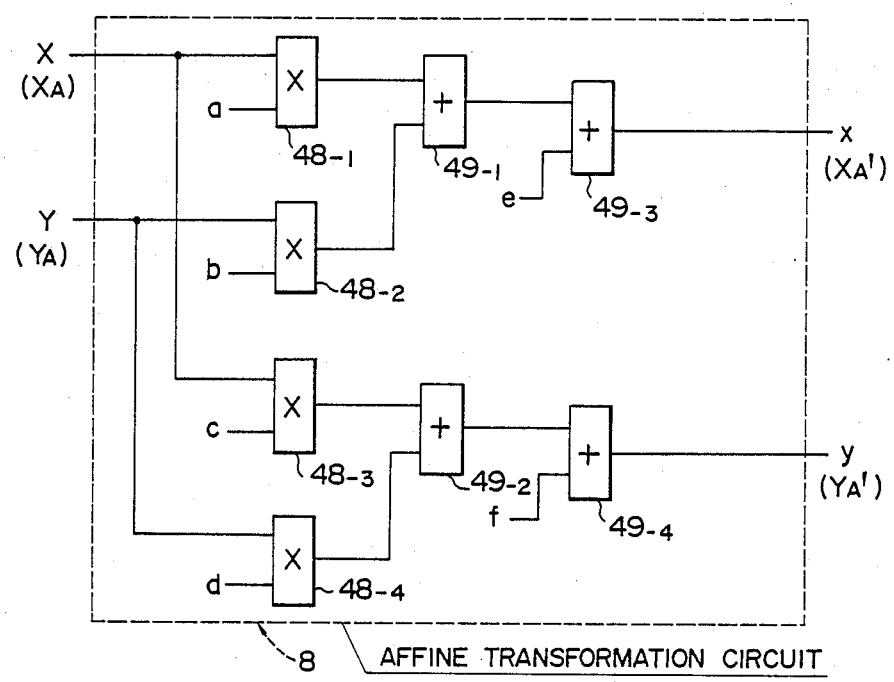
FIG. 10 is a diagram of one embodiment of an affine transformation circuit.

Similar to the outputs $X_A,Y_A$ of the address generation circuit 9 depicted in FIG. 4, the respective outputs $X_A,Y_A$ of the X-counter 50 and Y-counter 51 are input to the affine transformation circuit 8 depicted in FIG. 10. The thus-transformed outputs $X_A',Y_A'$ are then modified into numeral addresses A' by the address modification circuit 9b so that corresponding addresses of the first memory 4 are designated.

The locations designated by the arrayed addresses $X_X,Y_A$ in accordance with the outputs $X_X,Y_A$ of the above-described X-counter 50 and Y-counter 51 as two-dimensional arrayed elements correspond exactly to the locations designated by using, as addresses, the value $A = j' \cdot Y_A + X_A$ output from the adder 53. In addition, the addresses obtained by subjecting the arrayed addresses $X_X,Y_A$ are also kept corresponding to the aforementioned locations. Their corresponding relations will not change even when they are modified back into numeral addresses.

It is therefore possible to change the image shape of the address area as desired by making a suitable section as to the counts n of the X-counter 50 in accordance with the address bit mode "j'".

Alternatively, the multiplier 52 may be provided on the output side of the X-counter 50 so as to output $A = j' \cdot X_A + Y_A$ as a result.

Similar to the above-described address modification circuit 9b, the address modification circuit 9b' composed of the above-described multiplier 52 and adder 53 can modify the arrayed address signals $X_A,Y_A$ into the numeral address signals A.

Figure 8:
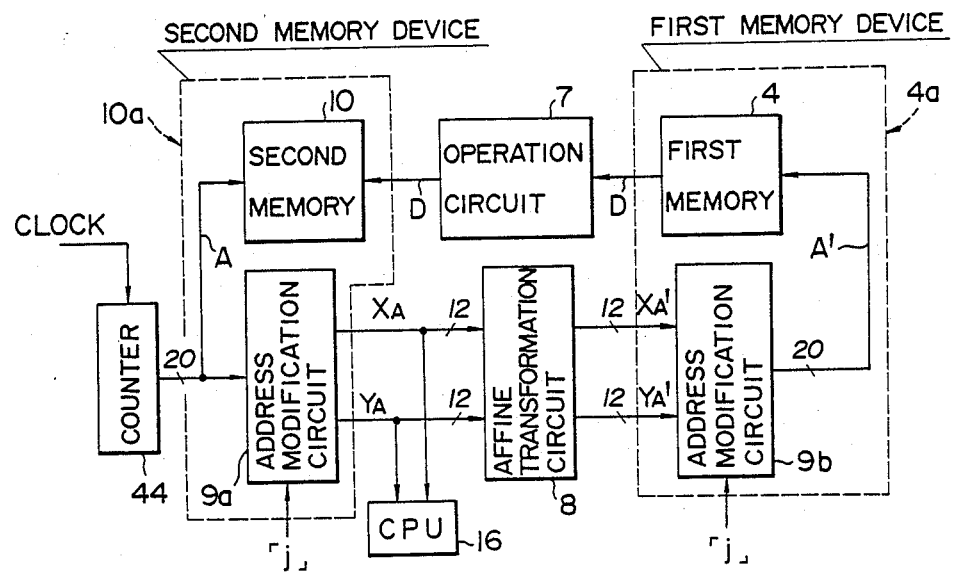
FIG. 8 is a block diagram illustrating the first embodiment in which the address modification circuits depicted respectively in FIGS. 4 and 6 are combined together to designate the addresses of the first and second memories.

FIG. 8 illustrates one example for performing image data processing by the address modification circuit 9a of the first type contained in the address generation circuit 9 depicted in FIG. 4 and the address modification circuit 9b of the second embodiment shown in FIG. 6.

Figure 7:
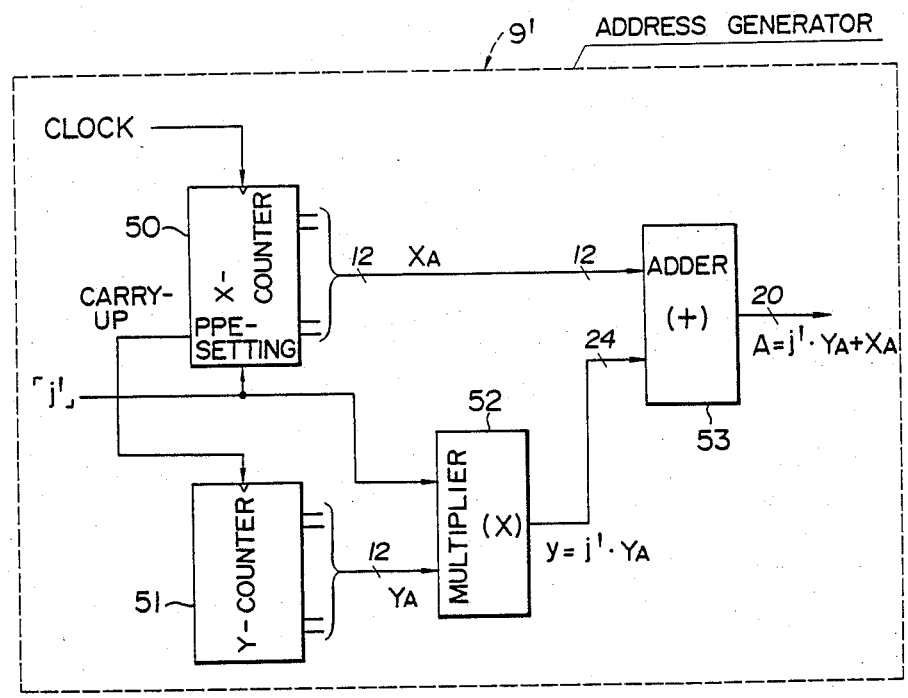
FIG. 7 is a block diagram illustrating the second embodiment of the address generator.

On the other hand, FIG. 9 shows another example for performing image data processing, which is similar to that performed in FIG. 8, by using the address generation circuit 9' depicted in FIG. 7 and the address modification circuit 9b' of the second type contained in the address generation circuit 9'.

Referring to FIG. 8, the numeral address signals A obtained by the counter 44 designate the addresses of the second memory 10 and at the same time, the address signals A are modified into the arrayed address signals $X_A,Y_A$ by the address modification circuit 9a. The arrayed address signals $X_A,Y_A$ are address-controlled by the CPU 16.

The arrayed address signals $X_A,Y_A$ obtained by the above-described address modification circuit 9a are input to the affine transformation circuit 8, where they are subjected to an affine transformation or inverse affine transformation. After they are modified further into numeral address signals by the address modification circuit 9b of the second type, the numeral address signals are output as address signals A for the first memory 4.

Regarding the numeral address signals A',A which directly designate the first memory 4 and the second memory 10 and control memory 15, their values do not have any particular significance in performing address control in subjecting two-dimensional images to data processing in accordance with this invention. Practically speaking, the arrayed address signals $X_A,Y_A$ for indirect address designation or the arrayed address signals $X_A',Y_A'$ obtained by subjecting the arrayed signals $X_A,Y_A$ to an affine transformation have significance in controlling addresses.

As a result, a memory device 4a provided before the address circuit of the first memory 4 and containing the address modification circuit 9b of the second type may be considered as an equivalent, namely, as a memory the address control of which is performed in accordance with substantially-arrayed addresses.

The second memory 10 having the address modification circuit 9a of the first type before the address circuit may also be considered as a memory device 10a the address control of which is performed in accordance with arrayed addresses, when viewed the side of the memory 10 from the side of the arrayed addresses.

For the reasons mentioned above, the arrayed address signals $X_A,Y_A$ will be used for designating the addresses of the respective memories 4,10,15 in the below-described processing of image data.

In the memory devices 4a,10a which contain the above-described address modification circuits 9a,9b and are address-controlled by multidimensionally-arranged addresses, the shape of its apparent address area can be freely changed by making the sizes of the respective arrayed elements X,Y of the arrayed addresses variable.

The affine transformation circuit 8 performs an inverse affine transformation in specific examples. Supposing that an image is located on the second memory 10, for example, after its affine transformation and subsequent rotation, the addresses $X_A,Y_A$ of the second memory 10 are subjected to an inverse affine transformation so as to determine the addresses x,y of the corresponding image on the first memory 4 before its rotation.

The general equation for the inverse affine transformation of the addresses, namely, for subjecting the image to the affine transformation to subject the coordinates of the image-copying side to an inverse affine transformation from the coordinates of the image-copied side may be expressed as follow:

$$\begin{pmatrix} x \\ y \end{pmatrix} = \begin{pmatrix} a & b \\ c & d \end{pmatrix}\begin{pmatrix} X \\ Y \end{pmatrix} + \begin{pmatrix} e \\ f \end{pmatrix} \tag{1}$$

FIG. 10 shows one example of a circuit for operating Equation (1).

The operation of the circuit is effected by performing Equation (1) as it is. At multipliers $48_1,48_2,48_3,48_4$, coefficients a,b,c,d are multiplied to the affine-transformed coordinates X,Y.

Then, the individual X members and Y members which have respectively been multiplied by the corresponding coefficients a–d are added respectively at the adders $49_1,49_2$. Furthermore, the multiplication results are respectively added with the coefficients e,f at the adders $49_3,49_4$ so that coordinate values x,y before the intended affine transformation are output.

As a result of transfer of an image from the first memory 4 to the second memory 10 by the inverse affine transformation of the addresses, the coordinates of the image, which is to be transferred to the coordinate system of the second memory 10, on the first memory 4 are determined from the coordinates of the image on the second memory 10 after its rotation by the affine transformation. Picture element data pertaining to the coordinates are then transferred to the coordinates from the first memory 4 after their affine transformation.

Similar to FIG. 8, the address modification circuit 9b' of the second type shown in FIG. 7 is provided before each of the address circuits of the first memory 4 and second memory 10 in FIG. 9. The memory devices 4a',10a' are hence constructed, the addresses of which are controlled respectively by arrayed address signals $X_A,Y_A$.

In this example, address signals for successively scanning the addresses of the second memory 10 are generated in accordance with the arrayed address signals $X_A, Y_A$. These arrayed address signals $X_A, Y_A$ are modified, as they are, into the numeral address signals A by the address modification circuit 9b' of the second type so as to designate the addresses of the second memory 10. On the other hand, the arrayed address signals $X_A'$, $Y_A'$ which have been subjected to the affine transformation or inverse affine transformation at the affine transformation circuit 8 are modified into the numeral address signals A' at the address modification circuit 9b' of the second type, thereby designating the addresses of the first memory 4.

In this example, the arrayed address signals $X_A, Y_A$ produced by the X-counter 50 and Y-counter 51 are input to the CPU 16 so that the address control is performed. Using bus lines 54,55, which input address signals to the CPU 16, as bi-directional buses, the arrayed address signals $X_A, Y_A$ may be fed directly from the CPU 16 to both memory devices 4a',10a' so as to perform the address control.

The image processing method of this invention will next be described on the basis of exemplary processing of a specific image.

Summarizing the present invention again, the present invention is directed to a method for reducing the processing time by dividing an image while effecting this division most effectively by choosing the optimal two-dimensional shape of a memory when the capacity of the image is greater than the capacity of the memory or when the capacity of the memory is insufficient for affine transformations even if their capacities are equal.

Figure 11B:
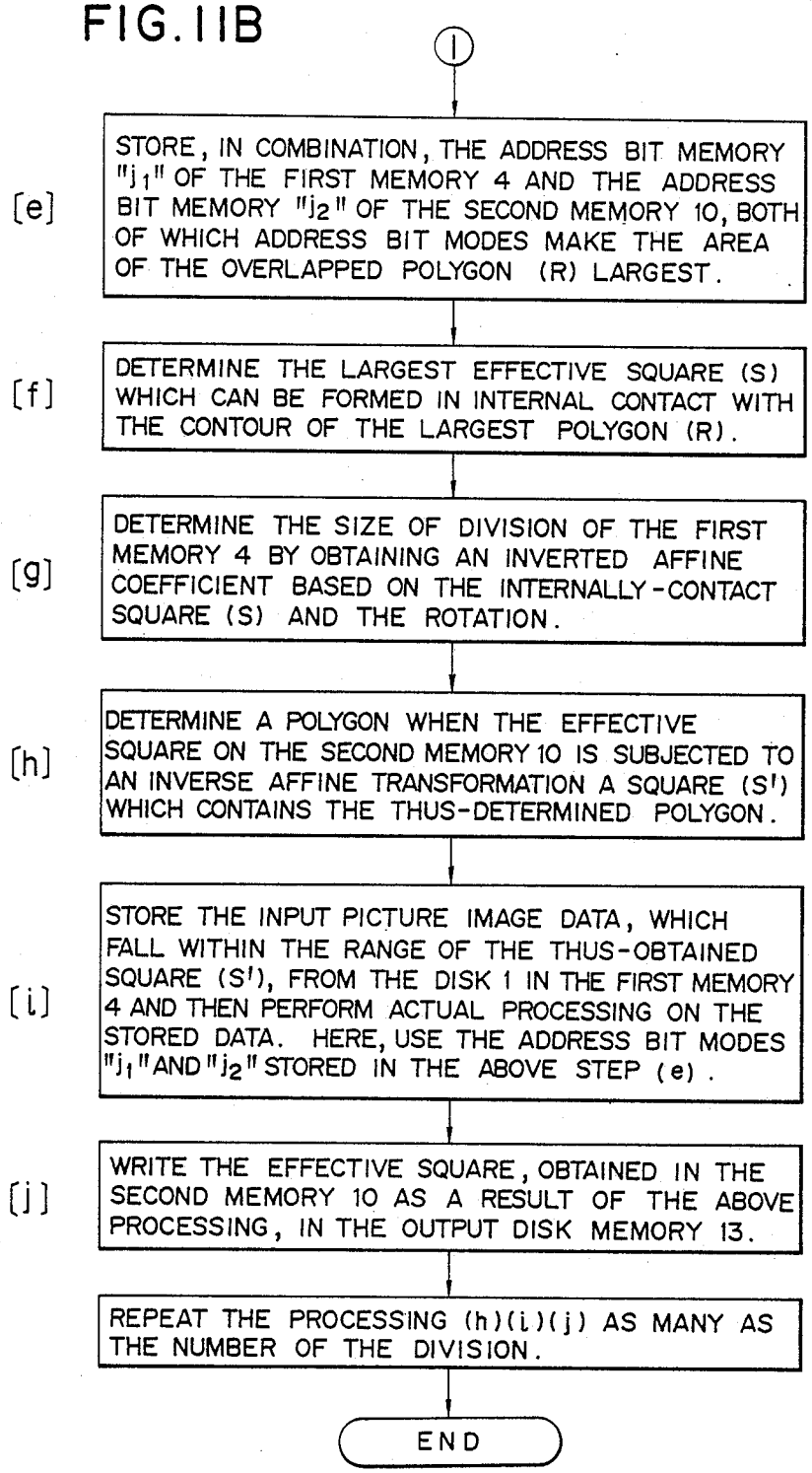

FIG. 11 is a flow chart of image processing in which desired image processing is performed by the layout scanner of FIG. 1. FIG. 12 is a drawing showing various steps in the course of a specific image processing performed following the flow chart of FIG. 11. Detailed description will hereinafter be made on the basis of both drawings.

As conditions for the processing, the overlapping between the shape of a two-dimensional memory area and an image to be loaded on the memory is supposed to be performed by always coinciding the centers of symmetry of both shapes.

In FIG. 11, the steps [a],[b],[c],[d],[e] are various steps for determining the optimal address bit mode "j". Namely, through these steps, it is possible to find out an address bit mode "j" which makes the area of an image P, which is to be transferred from the first memory 4 to the second memory 10, maximum.

In the step [f], a square s internally contacting the contour of an image transferred with the above-determined address bit mode from the first memory 4 to the second memory 10 and having sides parallel respectively to the X- and Y-axes is determined within the image R.

The inside of the square s serves as a single processing unit adapted to image processing by introducing an image from a low-speed disk memory 1. Owing to this pre-processing, it is possible to reduce the number of access to the disk memory 1 or to simplify the division of the image with a high level of efficiency.

The steps [g],[h],[i],[j] are steps in which actual image processing is performed. These steps will hereinafter be described in detail.

The steps [a],[b],[c],[e],[f],[g],[h] are performed primarily by software, while the steps [i], [j] are performed by the hardware shown in FIG. 1, i.e., by the intermemory transfer shown making use of the first memory 4 and second memor 10 and by the pipeline processing effected by the operation circuit 7 interposed between the memories.

The outline of a specific image processing method will next be described with reference to FIG. 12.

In FIG. 12, the steps (i)–(xiii) illustrate how the original image 27 shown in the step (i) and loaded on the input disk memory 1 for its processing is processed in accordance with the flow chart of FIG. 11.

As shown in the steps (i),(ii) of FIG. 12, the step [a] of FIG. 11 contemplates a situation in which the original image 27 is greater than the memory sizes of the first and second memories 4,10. As initial conditions right after the start, the address bit mode "j" of the first memory 4 is set, for example, at "1".

In the illustrated example, an overlapped polygon P in the step (ii) has exactly the same size as that written in the first memory 4 of the address bit mode "1".

Figure 13:
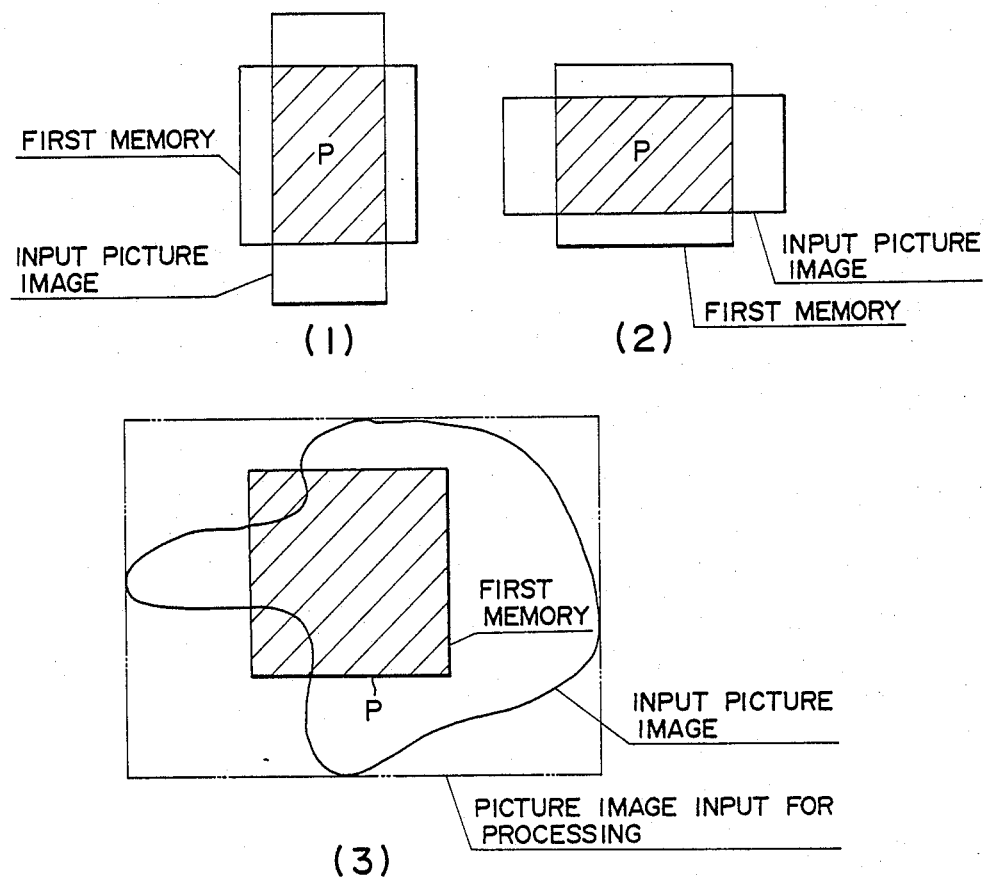
FIG. 13 is a drawing depicting the sizes of an input image and a first memory.

Supposing that the size of the original image 27 and that of the first memory 4 are suitably overlapped in such a case as FIG. 13(1) or FIG. 13(2), the polygon P can be calculated by determining, as solutions of a simple linear equation, the crossing points of the contours of the original image 27, which is being processed, and the first memory 4 when they are overlapped with their coordinate centers coincided.

When the contour of the original image 27 has a complex shape as illustrated in FIG. 13(3), a similar calculation is effected by determining an imaginary original image surrounded by a square which circumscribes the entirety of the original image 27. The imaginary original image is to be processed.

In the step [b] shown in FIG. 11, a polygon Q obtained by rotating the overlapped polygon P, which has been determined in the step [a], over a predetermined angle is determined on the coordinate system of the first memory 4. This can be done by performing an affine transformation on the coordinates of each vertex of the polygon P [see, the step (iii) in FIG. 12].

In the step [c], the polygon Q determined in the step [b] and an overlapped polygon R between the polygon Q and the second memory 10, which is adapted to output images, are determined on the coordinate system of the second memory 10 [see, the steps (iv),(v) in FIG. 12].

Here, supposing that the coordinates of the vertex $P_i$ of the polygon P are $X_i Y_i$, the size $(X_{max}, Y_{max})$ of the X- and Y-addresses of the first memory 4 of the address bit mode "j" is $X_j Y_j$, the point of symmetry of the first memory 4 the overlapping center of which is registered with the polygon P is located at the center $(X_j/2, Y_j/2)$ of the meoory, and the polygon P is rotated over an angle $\theta$, the coordinates of the vertex $Q_i$ of the thus-rotated polygon Q are determined in accordance with the following equation:

$$Q_i \text{ (each vertex)} = A \cdot P + B$$

$$A = \begin{pmatrix} \cos\theta & \sin\theta \\ -\sin\theta & \cos\theta \end{pmatrix}$$

$$B = (\tfrac{1}{2}X_j(1-\cos\theta) + \tfrac{1}{2}Y_j\sin\theta), (\tfrac{1}{2}Y_j(1-\cos\theta) + \tfrac{1}{2}X_j\sin\theta),$$

With respect to the pattern overlapped between the the polygon Q and the image-outputting second memory 10, its $R_i$s can be obtained by determining the crossing points between respective line segments. Generally speaking, the crossing point $R_o$ between line segments $\overline{P_n,P_{n+1}}$ and $\overline{Q_m, Q_{m+1}}$ can be determined in the following manner (note: j=x,y):

$P_i = (px_i, py_i)$ $Q_i = (qx_i, qy_i)$ $P_j = pj_2 - pj_1$ $q_j = qj_2 - qj_1$ $r_j = qj_2 - qj_1$

Here, supposing $$t = \frac{1}{D}(qyrx - px \cdot qy), s = \frac{1}{D}(px \cdot ry - pyrx)$$

when $D = px \cdot qy - pyqx \neq 0$, the crossing point R between $\overline{P_1P_2}$ and $\overline{Q_1Q_2}$ is expressed as follow:

$R(x,y) = (px_1 + px \cdot t, py_1 + py \cdot t)$ provided that $0 \leq t \leq 1$ and $0 \leq s \leq 1$.

Accordingly, when the vertexes of the polygon P having n vertexes on the first memory 4 and the vertexes of the polygon Q having m vertexes on the second memory 10 are represented respectively by $P_i$ and $Q_i$, the vertexes of the polygon R formed between the polygon P having the n vertexes and the polygon Q having the m vertexes are classified into the following three groups:

(1) $P_i$s located within the polygon Q;
(2) $Q_i$s located within the polygon P; and
(3) vertexes located at crossing points $R_i$ between $\overline{P_iP_{i+1}}$ and $\overline{Q_jQ_{j+1}}$.

By the above calculation, the polygon R can be determined. Furthermore, the area of the polygon R is determined in the step [c]. This area may be determined in accordance with the Heron's formula, namely, by drawing line segments from the center of the polygon R to the respective vertexes $R_i-R_m$ to divide the polygon R into triangles and then summing up the areas of the triangles.

In the step [d], the address bit mode "j" of the image-outputting second memory 10 is changed to determine an address bit mode "$j_2$" which makes the area of the polygon R largest.

By repeating the steps [a]–[d], the largest polygon R is respectively obtained with respect to the address bit modes "j" of the image-inputting first memory 4, whereby the optimum address bit mode "$j_1$" of the image-inputting first memory 4 at that time is obtained.

In the above manner, the optimum address bit modes "$j_1$","$j_2$" of the first memory 4 and second memory 10 are determined.

In the conventional processing described above by way of example in FIG. 3, the lengths of the X- and Y-addresses of the memories cannot be changed by the address bit modes "$j_1$","$j_2$". Therefore, the conventional processing method requires many processing operations.

Since the polygon R having the largest area has been determined, an effective inscribed square s which is to be actually processed is determined within the polygon R. Determination of the effective inscribed square s is effected in order to permit direct transfer of an output image to the output disk memory 13 when the output image is formed on the second memory 10 and at the same time, to simplify the division of the image for simpler processing.

The step (vii) of FIG. 12 shows the effective inscribed square s determined in the step (vi). The step (viii) shows an allocation sketch for X- and Y-addresses in order to use the effective inscribed square s for dividing the finally output image. In step (ix), the finally output image has been divided by the effective inscribed square s to which X- and Y-addresses have been allocated.

Figure 14:
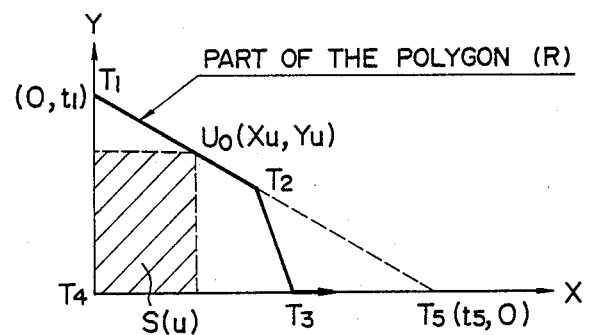
FIG. 14 illustrates the manner for obtaining the maximum value of an area (S).

The effective inscribed square s may be determined as will be described with respect to the example of FIG. 14.

In the step (vi), the origin of the coordinate system on the second memory 10 is supposed to be in registration with the center of the effective inscribed square s. First of all, supposing that a part of the overlapped polygon R, which part is similar to that depicted in FIG. 14, is contained in the first quadrant, the crossing points between the sides of the polygon R and the X- and Y-axes are given by $T_3$ and $T_1$ respectively and the polygon R is supposed to have a vertex at $T_2$. $T_5$ indicates the crossing point between an extension of the line segment $\overline{T_1T_2}$ and the X-axis. $T_4$ indicates the origin of the coordinate system.

When respective coordinates are given as indicated in the figure, a vertex $U_o$ of a rectangle is located on a line segment $\overline{T_iT_{i+1}}$ ($\overline{T_1T_2}$ in the illustrated example).

In this case, the area $S(u)$ of the rectangle is expressed by the following equation.

$S(u) = xu \cdot yu$

When u moves along the ling segment $\overline{T_iT_{i+1}}$, the position $U_o$ at which the area $S(u)$ becomes largest is given as follow:

$U_o: (t_{\frac{1}{2}}, t_5/2)$

Unless $U_o$ is located on the line segment $\overline{T_iT_{i+1}}$, the point closer to $U_o$ is chosen from $T_i$ and $\overline{T_{i+1}}$.

The above operation is carried out with respect to all the segments $\overline{T_iT_{i+1}}$ to determine $U_o$ coordinates which makes the area $S(u)$ largest. In this manner, the size of division capable of processing the image with the largest area, namely, the effective inscribed square s in the area overlapped between the first memory 4 and second memory 10 is determined.

The step (ix) of FIG. 12 illustrates, by way of example, an image output as a result of the processing on the output disk memory 13, in which the image has been divided by the effective inscribed square s under the above-described conditions.

Then, in the step [g], this effective inscribed square s is taken into consideration with reference to the original image 27 on the input disk memory 1, in which the original image 27 is before its affine transformation. For this purpose, it is necessary to subject the effective inscribed square s to an inverse affine transformation. This operation is shown as the step (x) in FIG. 12.

Next, similar to the step [f], a rectangle s' surrounded by sides which are respectively parallel to the X- and Y-axes is taken into consideration with reference to the original image 27. This operation is also necessary to read out the original image 27 from the input disk memory 1 and to simplify the processing. However, a circumscribed square s' is determined here.

Since the image to be processed is the original image 27, an image section the addresses of which have been designated by the inverse affine transformation of the corresponding addresses of the second memory 10 is required in its entirety even if the image section may partly overlapped with the first memory 4. This is shown in the step (xi) of FIG. 12.

This circumscribed square s' can be determined with ease. It can be determined depending on the maximum values of the coordinates of the respective vertexes of the effective inscribed square s, which have been subjected to the inverse affine transformation from the second memory 10 to the first memory 4, on the first memory 4.

The above-determined area of the circumscribed square s' is naturally of a size corresponding to the optimum address bit mode "$j_i$" of the first memory 4. Accordingly, the respective coordinates of the circumscribed square s' which is adapted to divide the original image 27 are determined in the step [h].

In the manner mentioned above, it is possible to determine the optimum address bit modes "$j_1$","$j_2$" of the image-inputting first memory 4 and image-outputting second memory 10 in performing processing on the original image 27 after the original image 27 has been rotated over the angle $\theta$.

The steps [i],[j] in the flow chart of FIG. 11 illustrate the procedures for actually performing their respective processings by means of hardware. In the steps (xii),(xiii) of FIG. 12, there are shown images stored respectively on the first memory 4 and second memory 10.

In the layout scanner shown in FIG. 1, the image processings described above with reference to FIGS. 11, 12 and 14 are performed in accordance with a program which has in advance been programed in the CPU 16. The optimum address bit modes "$j_1$","$j_2$" determined in the course of performance of the image processings are fed or transferred as control data to the address modification circuits 9a,9b.

Although the address designation of locations for dividing and reading out an image from the input disk 1 and output disk 13 and theaddress designation of locations for writing the image are not illustrated in any figures, they are performed in a usual manner while controlling the disks by the CPU 16.

Furthermore, the affine coefficients (a, b, c, d, e and f, all shown in FIG. 5) determined in the step [j] are similarly transferred to the affine transformation circuit 8 by the CPU 16.

In the manner mentioned above, subsequent to the setting of data, data pertaining to the effective square s' obtained by the division of the original image are loaded from the input disk 1 onto the first memory 4.

Then, the address generation circuit 9 is actuated to designate the addresses of the second memory 10 one by one from the leading address thereof.

At this time, the same addresses are input to the affine transformation circuit 8, in which the inverse affine coefficients have been preset, in accordance with the conditions of rotation preset upon the division of the image.

The affine transformation circuit 8 performs the inverse affine transformation on the input addresses so as to designate addresses of the first memory 4. If image data are present on the thus-designated addresses, the image data are transferred from the first memory 4 to the second memory 10 provided that the addresses actually present on the first memory 4 are designated.

Upon completion of one division, the contents of the second memory 10 are stored in the output disk 13 and the next division of the original image is then processed in the same manner. This processing is repeated as many times as the number of the division.

Needless to say, various other image operations can also be performed, in combination with rotation processing such as coordinate conversion or the like, on the transferred image data because the image data pass through the operation circuit 7 in the course of their transfer from the first memory 4 to the second memory 10. It is also possible to introduce a plurality of reading and writing cycles in a single address designation period so that the corresponding image data are reciprocated between the first memory 4 and the second memory 10 and during their reciprocation, a variety of operation processings may be performed on them by means of the operation circuit 7.

Using the control memory 15, it is also feasible to perform an image operation on a part of a image or to apply a mark to a part of an operated image.

In addition, it is also possible to store an image on the second memory 10 in advance so that a part of another image, which has been subjected to a coordinate conversion and transferred from the first memory 4 and has then been masked in accordance with the contents of the control memory 15, is transferred onto the second memory 10 so as to combine the first-mentioned image and the part of the second-mentioned image on the second memory 10. Namely, a layout operation inclusive of image assembly and an image processing inclusive of coordinate conversion can be performed at the same time.

In the above examples, the coordinate conversion by the affine transformation was described, taking the most complex rotating by way of example. Even when other affine transformations, e.g., expansion or reduction, deformation and the like are required for the image, they may be performed in a single operation because the generality of the affine transformation is still maintained.

In the above examples, the picture elements of the high-density image were subjected one by one to image processing. Even if processings such as operation into image data, coordinate conversion such as rotation, assembly of plural imges (layout), etc. have already been performed on a coarse image compressed in advance by thinning or the like, respective data can still be obtained on the basis of the processed coarse image by simply correlating the operation with the operation on the actual image density and making use of the above-described calculations.

Namely, data dealt with upon rotation or relocation performed on a coarse image obtained by choosing certain representative picture elements or upon changes in graduation performed on such a coarse image by means of a lookup table are coordinate values of the representative picture elements, image data (density values) matching the coordinate values, and values referred to as image data and written in the table. Therefore, calculations can be made on the basis of highly-accurate data (values) which each of the representative picture element has inherently. This feature is very useful for actual layout scanners. The method of this invention can also be used effectively for such actual layout scanners.

Having now fully described the invention, it will be apparent to one of ordinary skill in the art that many changes and modifications can be made thereto without departing from the spirit or scope of the invention as set forth herein.

We claim:

1. A method for processing data of an original picture, comprising the steps of:
   (a) storing data as image data in a memory having a large capacity and a relatively low access speed;
   (b) dividing at least one group of the data into a plurality of data portions, on the basis of a processble size, between two memories capable of performing writing and reading at high speeds;
   (c) reading out the image data in each data portion from the low-speed memory to perform at least one type of image processing on the read-out image data between the two high-speed memories;
   (d) storing the thus-processed image data against in the low-speed memory; and
   (e) performing the above steps (b) through (d) repeatedly on all of the data of the original picture so as to store the processed data of the original picture in the large-capacity and low-speed memory; wherein address control for each of the two high speed memories employed in the course of the image processings (b) through (e) is performed in accordance with a multidimensional array and addresses of one of the two high speed memories are identified by an affine transformation or inverse affine transformation of addresses of the other high speed memory, whereby the processing of the image data between the two high speed memories is performed in such a way that the image data, which is transferred between both high speed memories, is subjected to the affine transformation or the inverse affine transformation, wherein prior to subjecting the image data to the affine transformation between the two high speed memories, the address control of each of which is performed in accordance with the multidimensional array, the initial setting upon performing the processing of the image data between both high speed memories is effected by finding out the degree of overlapping between the two-dimensional address area of the high speed memory in which the image data before the affine transformation thereof are stored, and the two-dimensional address area of the high speed memory in which the affine-transformed image data are stored through the inverse affine transformation of the addresses of one of the high speed memories, changing the address length or lengths of the two-dimensional array or arrays of either one or both of the memories so as to optimize the overlapped area, obtaining parameter or parameters corresponding to the address length or lengths and then obtaining an affine coefficient by which the addresses of both high speed memories are corresponding to each other through inverse affine transformation.

2. A method according to claim 1, wherein address signals which are subjected to the affine transformation or the inverse affine transformation are multidimensionally-arrayed address signals adapted to perform the address control of the two memories.

3. A method according to claim 1 or 2, wherein addresses of the memory, which receives and stores image data, are successively identified in advance and then subjected to the inverse affine transformation so as to designate addresses of the memory to which the image data are sent, whereby image data to be subjected to the affine transformation for storage in the latter memory are retrieved on the memory from which the image data are sent out.

4. A method according to claim 1 or 2, wherein when the memory for the reception and storage of image data contains insufficient image data for the affine transformation and subsequent storage, image data to be stored in the memory for sending out image data are replaced by other image data so that the memory adapted to receive image data is filled with affine-transformed image data.

5. A method according to claim 1 or 2, wherein the processing of the image data effected between the two high speed memories is coordinate conversion which is effected by the affine transformation or inverse affine transformation to perform rotation, expansion, reduction, deformation or the like of the image.

* * * * *

UNITED STATES PATENT AND TRADEMARK OFFICE
CERTIFICATE OF CORRECTION

PATENT NO. : 4,790,025

DATED : December 6, 1988

INVENTOR(S) : Toshifumi INOUE, Minsuhiko YAMADA & Shigeru MIKI

It is certified that error appears in the above—identified patent and that said Letters Patent is hereby corrected as shown below:

Column 21, line 19 - change "against" to "again";

Column 22, line 40 - insert "a" before "coordinate".

Signed and Sealed this

Sixteenth Day of May, 1989

Attest:

DONALD J. QUIGG

Attesting Officer

Commissioner of Patents and Trademarks